W. EBERLE.
MECHANICAL MOVEMENT.
APPLICATION FILED NOV. 27, 1912.
1,063,785.
Patented June 3, 1913.
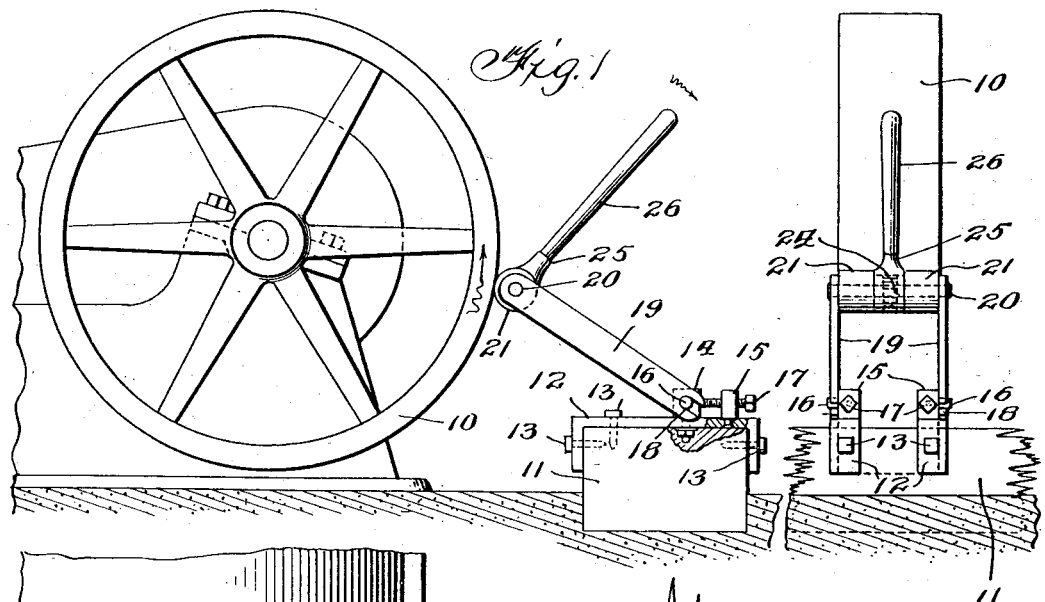
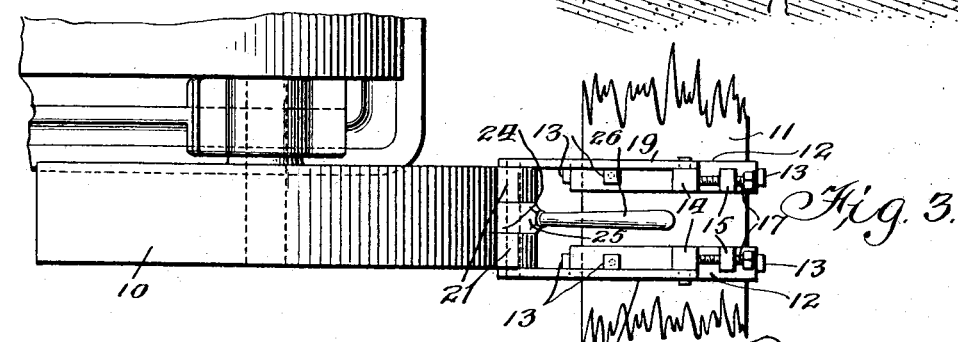
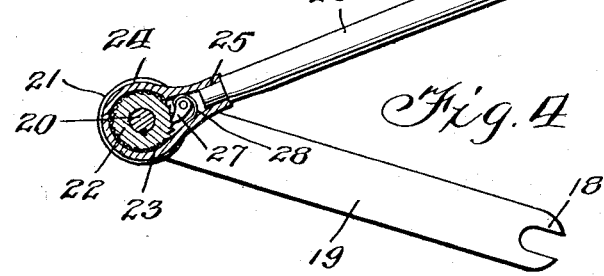
Witnesses:
Inventor
William Eberle.
By his Attorneys
Mason Fenwick & Lawrence.

United States Patent Office.

WILLIAM EBERLE, OF JERSEY CITY, NEW JERSEY.

MECHANICAL MOVEMENT.

1,063,785.

Specification of Letters Patent.

Patented June 3, 1913.

Application filed November 27, 1912. Serial No. 733,893.

*To all whom it may concern:*

Be it known that I, WILLIAM EBERLE, a citizen of the United States, residing at Jersey City, in the county of Hudson and State of New Jersey, have invented certain new and useful Improvements in Mechanical Movements; and I do hereby declare the following to be a full, clear, and exact description of the invention, such as will enable others skilled in the art to which it appertains to make and use the same.

This invention relates to mechanical movements and has for an object to provide means for transmitting motion from a small roller to an enlarged roller or wheel by frictional contact and further means of increasing the frictional contact of the two rollers as is necessary.

An object of this invention is to provide an effective device to serve its purpose which may be readily removed from its support when not in use.

A further object of this invention is the provision of a device which by a rotating motion of a portion thereof produces a circumferential movement of a larger roller or wheel such as a fly wheel and a binding action against the periphery thereof to insure frictional contact.

This invention is applicable to various purposes such as a substitute for a gear and pinion, or any transmission of energy from a small wheel to a larger one.

In showing and describing this invention, I have shown it as a fly-wheel starting device in which, Figure 1 is a side elevation of the device applied for usage showing parts thereof in section, Fig. 2 is a rear elevation thereof, Fig. 3 is a plan view thereof, and, Fig. 4 is an enlarged sectional view through a portion of the device.

Referring to the drawings there is shown a fly-wheel 10 which in this case rotates in the direction of the arrow but in the event of rotation in the opposite direction, the apparatus to be hereinafter mentioned will be placed on the opposite side of the wheel. Embedded in the flooring in advance of the fly-wheel is a timber 11 to which are secured the clamping members 12 which may be secured as by the lag screws 13 and rising from these clamps are the blocks 14 and 15, the blocks 14 having pins 16 extending from one side thereof and the blocks 15 being internally threaded to receive an adjusting screw 17. The pins 16 receive the notched ends 18 of links 19 which carry a shaft 20 at the opposite ends thereof and this shaft carries the rollers 21 which are intended to impinge against the periphery of the fly-wheel when in use.

In assembling the several parts for usage the distance between the axis of the fly-wheel and the axis of the pin 16 is less than the combined distance of the radius of the fly-wheel plus the distance from the pin 16 to the extreme circumference of the rollers 21 so that the links 19 which carry the rollers 21 create a binding action of the rollers 21 against the fly-wheel.

Between the rollers 21 is a section 22 which is provided with a series of ratchet teeth 23 as well as flanges at the ends of the ratchet teeth to receive a band 24 which terminates in the socket 25 to receive the operating handle 26. A pawl 27 is carried by the band 24 and a spring 28 is carried by this pawl to cause the same to engage one or another of the ratchet teeth 23.

When it is desired to use the device the links 19 are positioned so that the fork ends 18 engage the pin 16 when these links are swung to cause the rollers 21 to engage the fly-wheel. Then the downward motion of the handle 26 imparts a rotary movement to the roller 21 through the medium of the pawl and ratchet arrangement, but should one movement of the lever be insufficient to rotate the fly-wheel sufficiently far beyond the dead center the handle 26 may be again raised to repeat the downward stroke and impart further rotary motion to the fly-wheel. When the fly-wheel has advanced beyond the dead center and continued operation imparted thereto, this device may be removed until required for subsequent usage.

In other applications of this invention, power may be applied to the small roller 21 by any desired means from which it is transmitted to the larger wheel and the principle is similar in all applications of this invention as rotation of the small wheel tends to cause the links 19 to swing and increase the impinging action between the rollers. As soon as the impinging action reaches the necessary degree, the larger roller rotates and maintains the impinging action to such a degree as to insure the proper frictional contact.

Various modifications may be made within the scope of this invention so I do not restrict myself to the identical form shown which is for illustrative purposes only.

Having thus described my invention, I claim:

In a mechanical movement, the combination of a wheel, a fixed anchor spaced therefrom, an adjustable fulcrum carried by said anchor, links removably secured to said fulcrum, rollers carried by said links, a serrated section between said rollers and an operating lever for imparting movement to said serrated section.

In testimony whereof I affix my signature in presence of two witnesses.

WILLIAM EBERLE.

Witnesses:
 GEORGE L. THOM,
 FRANK W. HERLENDAY.

Copies of this patent may be obtained for five cents each, by addressing the "Commissioner of Patents, Washington, D. C."